United States Patent
Kozyrev et al.

(10) Patent No.: US 12,351,472 B2
(45) Date of Patent: Jul. 8, 2025

(54) METHOD FOR EXTRACTING SCANDIUM FROM SCANDIUM-CONTAINING MATERIALS

(71) Applicant: Obshchestvo S Ogranichennoy Otvetstvennost'yu "Obedinennaya Kompaniya Rusal Inzhenerno-Tekhnologicheskiy Tsentr", Krasnoyarsk (RU)

(72) Inventors: Aleksandr Borisovich Kozyrev, Krasnoyarsk (RU); Ol'ga Viktorovna Petrakova, Krasnoyarsk (RU); Aleksandr Gennadievich Suss, Krasnoyarsk (RU); Andrej Vladimirovich Panov, Krasnoyarsk (RU)

(73) Assignee: OBSHCHESTVO S OGRANICHENNOY OTVETSTVENNOST'YU "OBEDINENNAYA KOMPANIYA RUSAL INZHENERNO-TEKHNOLOGICHESKIY TSENTR", Krasnoyarsk (RU)

(*) Notice: Subject to any disclaimer, the term of this patent is extended or adjusted under 35 U.S.C. 154(b) by 557 days.

(21) Appl. No.: 17/942,024

(22) Filed: Sep. 9, 2022

(65) Prior Publication Data
US 2023/0020915 A1 Jan. 19, 2023

Related U.S. Application Data

(63) Continuation of application No. PCT/RU2020/050298, filed on Oct. 28, 2020.

(30) Foreign Application Priority Data

Mar. 10, 2020 (RU) ............................ RU2020109988

(51) Int. Cl.
*C01F 17/10* (2020.01)
*C01F 17/212* (2020.01)
(Continued)

(52) U.S. Cl.
CPC ............ *C01F 17/10* (2020.01); *C01F 17/212* (2020.01); *C22B 3/12* (2013.01); *C22B 3/22* (2013.01); *C22B 59/00* (2013.01)

(58) Field of Classification Search
None
See application file for complete search history.

(56) References Cited

U.S. PATENT DOCUMENTS

2016/0145714 A1* 5/2016 Liddell .................... C25C 1/20
75/421
2016/0340757 A1* 11/2016 Higaki .................... C22B 3/08
(Continued)

FOREIGN PATENT DOCUMENTS

CN 108411110 B 8/2019
RU 2078044 C1 4/1997
(Continued)

OTHER PUBLICATIONS

English translation of the International Search Report dated Feb. 4, 2021 in connection with International Application No. PCT/RU2020/050298, 2 pages.

*Primary Examiner* — John J Figueroa
(74) *Attorney, Agent, or Firm* — Baker & Mckenzie LLP

(57) ABSTRACT

A method for extracting scandium from scandium-containing materials, said method comprising: re-slurring of a cake of a scandium-containing material with a mixture of sodium carbonate and sodium bicarbonate, carbonization leaching of the scandium-containing material with the mixture of sodium carbonate and sodium bicarbonate in one stage, filtration of the leached scandium-containing material and
(Continued)

the precipitation of a scandium concentrate. The carbonization leaching of the scandium-containing material is carried out with a mixture of sodium carbonate and sodium bicarbonate having a $Na_2CO_3$ concentration of 130-350 $g/dm^3$ and a $NaHCO_3$ concentration of 2-100 $g/dm^3$ at a pH value in the slurry of 9.5-11.0 and a temperature of 20-90° C. For maintaining the required pH value in the slurry, the slurry is gassed with a $CO_2$-containing gas-air mixture. The scandium concentrate is extracted from the filtrate resulting from the leaching process in one stage by treating said filtrate with an alkaline solution.

11 Claims, 1 Drawing Sheet

(51) Int. Cl.
*C22B 3/12* (2006.01)
*C22B 3/22* (2006.01)
*C22B 59/00* (2006.01)

(56) References Cited

U.S. PATENT DOCUMENTS

| | | | |
|---|---|---|---|
| 2018/0087128 A1* | 3/2018 | Nagai | C01F 17/271 |
| 2019/0078175 A1* | 3/2019 | Xu | C22B 59/00 |
| 2021/0163309 A1* | 6/2021 | Paquin | B01J 45/00 |

FOREIGN PATENT DOCUMENTS

| | | |
|---|---|---|
| RU | 2630183 C1 | 9/2017 |
| RU | 2647398 C2 | 3/2018 |
| WO | 2012126092 A1 | 9/2012 |

* cited by examiner

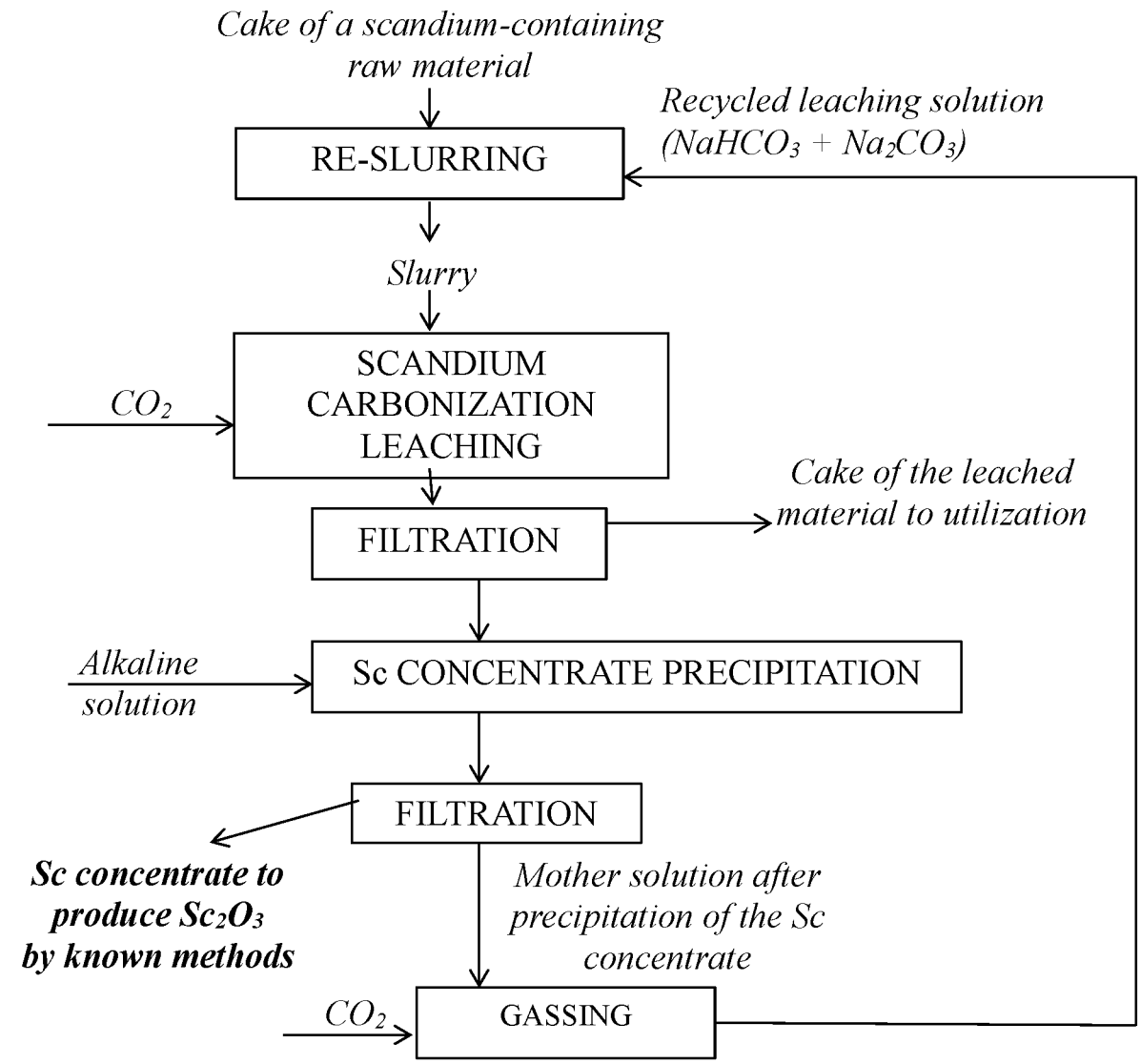

METHOD FOR EXTRACTING SCANDIUM FROM SCANDIUM-CONTAINING MATERIALS

CROSS-REFERENCE TO RELATED APPLICATIONS

This application is a continuation of and claims priority to PCT Application No. PCT/RU2020/050298 filed on Oct. 28, 2020, titled "Method For Extracting Scandium From Scandium-Containing Materials" which itself claims priority to Russian Patent Application No. 2020109988 filed on Mar. 10, 2020. The contents from all the above are hereby incorporated in their entirely by reference.

TECHNICAL FIELD

The disclosure relates to the field of chemistry and non-ferrous and rare metal processes, in particular to a process of scandium extraction and concentration, and can be used in the production of scandium from various kinds of scandium-containing materials, specifically from red muds of alumina production and wastes generated from processing titanium-, zirconium-, tungsten-, nickel-, niobium-, and tantalum-containing raw materials.

In recent years, there has been an increase in demand for scandium oxide and scandium-containing materials. By 2028, the demand for scandium is expected to ramp up to 300 tons per year (tpy) (based on scandium oxide) due to the expansion of its applications in such industries as shipbuilding, aerospace and automotive, aviation, 3D printing, etc. Aluminum alloys containing 0.1-0.5% of scandium are characterized by a unique combination of strength and corrosion properties. A wider use of scandium-containing alloys is limited by the high cost of scandium; therefore, the development of a technology for the production of scandium oxide that enable cost reductions to allow considerably expanding the market of scandium-containing materials and the products based thereon.

It is well known that scandium is a typical trace element and does not form any mineable minerals. The main sources of scandium are bauxites, lateritic ores, rare metal ores and the wastes from the processing thereof, which contain from 40 to 500 grams per metric ton (g/t) of scandium oxide. The majority of known methods of scandium extraction are based on hydrometallurgical methods (leaching, sorption, extraction, and hydrolysis).

BACKGROUND

The related art discloses a method for the production of scandium oxide from red mud, which comprises: multiple (7 cycles) sequential leaching of red mud with a mixture of sodium carbonate and sodium bicarbonate solutions while passing the red mud through a CO2-containing mixture of exhaust gases from sintering kilns; separation; washing of the mud with the further extraction of scandium oxide from the obtained solution. This method foresees allowing said solution to stand at elevated temperatures with selective separation of precipitates after each stage of such standing (there are three stages), wherein at the first stage the solution is heated to a temperature of no more than 80° C. and allowed to stand for at least 1 hour with further settling for at least 2 hours under ambient cooling conditions; at the second stage the solution is heated to boil and kept boiling while stirring for at least 2 hours; at the third stage the filtrate is evaporated to reduce the volume by 50% with the further addition of a 46-% sodium hydroxide solution to obtain a $Na2O_{caustic}$ concentration of 1.5-2.0 kg/m³, kept boiling for at least 2 hours with the further settling of a scandium-containing precipitate for 10-16 hours under ambient cooling conditions. The content of scandium oxide in the target product, i.e., a scandium concentrate, amounts to 5.2% Sc2O3 (3.40% Sc); the amount (yield) of the scandium concentrate is ~290 g/t of processed red mud. The recovery of scandium oxide after the first cycle of the "recycling process", which represents returning a crude Sc-containing solution obtained in one cycle for the carbonization leaching of scandium from a fresh batch of red mud, amounted to 15.8% of the initial content of scandium oxide (Sc2O3) in the mud; altogether, the total extraction (after 7 cycles) amounted to 13.6% (Patent RU2483131, publication date: May 27, 2013).

The substantial drawback of this method is a low degree of scandium extraction, which, in total, does not exceed 13.6%, as well as the duration of the process and high power consumption to carry out the method due to the three-stage standing of the scandium-containing solution at elevated temperatures, including the evaporation of the solution to reduce its volume by 50%.

The related art also discloses a method for the extraction of scandium from red muds, said method comprising: multiple sequential leaching of red mud with a carbonate solution containing a mixture of 85-100 g/dm³ $NaHCO_3$ and 20.0-45.0 g/dm³ Na2CO3 or 125 g/dm³ NaHCO3 while passing a CO2-containing mixture through the red mud at a pressure of 3.0-6.0 atm under vibro-cavitation conditions with the further two-stage standing of the pregnant solution at elevated temperatures: at the first stage it stands at a temperature of no less than 90° C. and a pH value of 9.0-9.5 for 3 hours followed by the filtration of formed low soluble impurity compounds, at the second stage it stands at a temperature of 100-110° C. for 3 hours with addition of a sodium hydroxide solution up to a pH value of 12.5 to cause the scandium concentrate to precipitate. This method enables to increase scandium extraction from red mud by carbonization leaching up to 20% after 5 recycling stages; the scandium oxide content in the target product amounted to 6.5 wt. % (Patent RU2562183, publication date: Sep. 10, 2015).

The drawback of the above method is also a low degree of scandium extraction and significant costs for carrying out the process due to the multiple recirculation of the solution for leaching new batches of red mud to concentrate scandium in the solution thus obtaining a low quality product, which leads to additional expenses for the after-treatment of the scandium concentrate to obtain scandium oxide.

The related art discloses a method for the production of scandium from scandium-containing raw materials, the method comprising: preparation of initial raw materials for sorption leaching in the "slurry-sorbent" system by slurry preparation with a sodium hydroxide solution; sorption leaching with the use of phosphorus-containing ion-exchange sorbents under continuous countercurrent conditions while monitoring the slurry pH value, which is maintained within 9.2-10.4 by adding compounds containing sodium carbonate or CO2-containing gases. Upon completion of the sorption leaching, the sorbent is washed, separated from the slurry, and converted, then scandium is desorbed with carbonate solutions, the sorbent is washed to remove the desorbing solution to be further used for sorption, and the scandium concentrate is extracted from the Sc-containing desorption solution using sodium hydroxide (Patent RU2694866, publication date: Jul. 17, 2019).

The proposed method for the extraction of scandium from scandium-containing raw materials allows improving scandium separation from other impurities and increasing the extraction up to 39%. However, the significant drawback of this method is the requirement to use a new portion of the sodium hydroxide solution in each leaching cycle, as well as lack of a stage to return the mother solution after leaching to a new process cycle, which results in a significant consumption of such reagents as sodium hydroxide and carbonate and, consequently, an increase in operational expenses.

The related art also discloses a method for the extraction of scandium from red muds of alumina production, which comprises: re-slurring of red mud with a solution containing a mixture of sodium carbonate and sodium bicarbonate in a concentration of 40-80 g/dm$^3$ (based on Na2O$_{total}$), sorption leaching of scandium from the slurry on a phosphorus-containing sorbent under continuous countercurrent conditions at a temperature of 40-90° C. and a mass ratio of solid and liquid phases in the red mud slurry of 1:2.5-5.0 (S:L), desorption of scandium from the ionite organic phase with a sodium carbonate solution in a concentration of 200-450 g/dm$^3$ to obtain a Sc-containing desorption solution, from which a scandium concentrate is extracted. After the sorption leaching, the scandium-depleted red mud slurry is directed to filtration and the obtained solution of sodium carbonate and sodium bicarbonate is gassed with a CO2-containing gas-air mixture to restore a ratio of Na2O$_{bicarb}$ to Na2O$_{total}$ of 50-100% and returned to the sorption leaching of a new batch of red mud, i.e., the leaching solution is a recycled solution, this fact enables to significantly reduce the sodium carbonate consumption. This method allows improving scandium extraction up to 47-50% and obtaining the Sc-containing desorption solution containing 100-270 mg/dm$^3$ of scandium oxide (Patent RU2692709, publication date: Jun. 26, 2019).

The drawback of the above method is that the sorbents require to be refilled on a regular basis due to their mechanical wear because of the direct contact of the sorbents with the slurry, which, normally, has abrasive properties.

The method closest to the claimed one, in terms of the set of features and designation, is a method for processing red mud to produce a scandium-containing concentrate (Patent RU2647398, publication date: Mar. 15, 2018), said method comprising: filtration of red mud to separate a liquid phase; re-slurring of a red mud cake with a recycled sodium-bicarbonate solution; gassing of the solution with carbon dioxide to obtain a pH value of <9; leaching of the red mud with the sodium-bicarbonate solution in one stage; filtration and washing of the red mud cake on the filter with water; sorption of scandium from the filtrate on a phosphorus-containing ionite (after that the recycled solution is returned for the re-slurring of the red mud cake); desorption of scandium from the phosphorus-containing ionite with a sodium carbonate solution to obtain a Sc-containing desorption solution, from which the hydrolytic precipitation of impurities is carried out at a pH value of 10.5-12.0 with the further extraction of a scandium concentrate at a pH value of 12.5-13.5. This method enables to achieve a scandium extraction of 28-29.1%, wherein the concentration of scandium oxide in the Sc-containing desorption solution amounts up to 700 mg/dm$^3$, and in the scandium concentrate it is 25-60%. Thus, unlike the previous method, this method allows reducing the consumption of the high-priced sorbent because sorption is carried out from the solution instead of the slurry to obtain the Sc-containing desorption solution with a higher content of scandium; however, it results in a lower extraction of scandium from red mud.

BRIEF DESCRIPTION OF THE DRAWINGS

FIG. 1 provides an exemplary flowchart for the extraction of scandium from scandium-containing materials according to some embodiments of this disclosure.

DETAILED DESCRIPTION

The objective of the present disclosure is to develop a new method for the extraction of scandium from scandium-containing materials; said method shall be characterized by simplifying a process flow diagram and improving the performance of a production process by means of increasing the extraction of scandium by selecting optimal parameters for the leaching thereof to ensure shifting the reaction equilibrium to form soluble complex compounds of scandium with carbonate ions due to the increase in the concentration of complex-former ions, and the selective dissolution of scandium in contrast to aluminum, titanium, and iron impurities, which during the leaching within a given pH range form insoluble hydroxides and are separated from a scandium-containing solution by filtration of the leached material (cake).

The technical effect lies in meeting the objective, increasing the extraction of scandium from a scandium-containing raw material including the reduction of operational and capital expenses due to simplification of a process flow diagram and abandonment of the use of high-priced reagents, i.e., ion-exchange sorbents, liquid and solid extraction agents.

The technical effect is achieved by a method of scandium extraction from scandium-containing materials, said method comprising: re-slurring of a cake of a scandium-containing material with a solution of a mixture of sodium carbonate and sodium bicarbonate; carbonization leaching of a slurry of the scandium-containing material with the solution of the mixture of sodium carbonate and sodium bicarbonate; precipitation and filtration of a scandium concentrate, wherein, in the present method, the carbonization leaching is carried out with a solution of a mixture of sodium carbonate and sodium bicarbonate with a No2CO3 concentration of 130÷350 g/dm$^3$ and a NaHCO3 concentration of 2÷100 g/dm$^3$ at a pH value in the slurry of 9.5-11.0, wherein the slurry is gassed with a CO2-containing gas-air mixture to maintain the required pH value, and the scandium concentrate is precipitated in one stage by treating the solution obtained after the leaching and filtration of the slurry of the scandium-containing material with an alkaline solution.

It is expedient, according to some implementations, to optimize the proposed method as follows:

Re-slurring of the cake of the scandium-containing material is carried out at a mass ratio of solid to liquid phases in the red mud slurry of 1:2÷20 (S:L) for 2-10 hours. Carbonization leaching of the scandium-containing material is carried out at a temperature of 20-90° C. The scandium concentrate is precipitated by treating the solution after leaching the scandium-containing material with the alkaline solution (a solution of sodium hydroxide or potassium hydroxide or a solution of ammonium hydroxide) at a pH value of 12÷13.5, a temperature of 50÷100° C., and a residence time of 1-3 hours, wherein the solution obtained after the extraction of the scandium concentrate is gassed with a CO2-containing gas-air mixture at a temperature of 15-50° C. to achieve the required Na2CO3 to NaHCO3 ratio and returned for re-slurring a new batch of the scandium-containing material.

An important difference of the method under the present disclosure from the prior art is that the scandium-containing material is leached with a solution of a mixture of sodium carbonate and sodium bicarbonate at elevated pH values and higher concentrations of the leaching agent, which provides for the maximum recovery of scandium into the solution with the minimum recovery of iron, aluminum, and titanium impurities, as downstream removal of these impurities (iron, aluminum, and titanium) requires an additional consumption of reagents, utilities and time. The improved selectivity of scandium extraction at a pH value of 9.5-11.0 is achieved due to the formation of insoluble hydroxo compounds of iron, aluminum, and titanium, wherein the presence of excessive carbonate- and bicarbonate-ions in the solution improves the solubility of scandium and its (scandium) dissolution from the solid phase into the solution due to the shifting of the reaction equilibrium to form scandium complex compounds with carbonate ions. Moreover, when the process temperature increases above 50° C., sodium bicarbonate, which is present in the solution, decomposes to emit ultra-disperse bubbles of carbon dioxide, which (the bubbles) also promote shifting the reaction equilibrium to form carbonate complex compounds of scandium and improve the degree of scandium extraction.

In contrast with the method selected as the closest prior art, according to which carbonization leaching is followed by the sorption of scandium from the solution on the ionite with the further concentration of scandium in the Sc-containing desorption solution, the method under the present disclosure foresees that the scandium concentrate is precipitated from the leaching solution, which is obtained from the filtration of the cake of the leached material, by treating said solution with an alkaline solution in one stage without preliminary precipitation of impurities, the amount of which (the impurities) is small due to optimally selected leaching conditions. It allows significantly simplifying the process flow diagram, as well as abandoning the use of high-priced sorbents, i.e., ion-exchange resins, and reducing the consumption of the reagents for scandium concentration and the purification of the scandium concentrate to obtain a scandium oxide product.

Carbonization leaching of scandium from a scandium-containing material at a pH value in the slurry of 9.5-11 using a solution with a $Na_2CO_3$ content of 130÷350 $g/dm^3$ and a $NaHCO_3$ content of 2÷100 $g/dm^3$ while simultaneously gassing the slurry with a $CO_2$-containing gas-air mixture allows achieving the maximum extraction of scandium into the solution with the minimum recovery of iron, aluminum, and titanium impurities.

The selective extraction of scandium into the solution at the leaching stage under optimally selected parameters enables to obtain a scandium-containing pregnant solution, the composition of which allows carrying out further concentration of scandium using a low-cost hydrolysis method, i.e., by treatment with an alkaline solution at a pH value of 12÷13.5 and a temperature of 50÷100° C. without any additional stages of scandium concentration and removal of impurities with the minimum consumption of the reagents to obtain a scandium concentrate that can be converted into a scandium oxide product by using a simple process flow diagram with minimum operational expenses.

Gassing the solution obtained after the extraction of the scandium concentrate with the $CO_2$-containing gas-air mixture at a temperature of 15-50° C. allows achieving in said solution a ratio of $Na_2CO_3$ to $NaHCO_3$ that is required for leaching and using it (said solution) to leach scandium from a new batch of the scandium-containing material thus minimizing the consumption of the leaching agent and $CO_2$, and to prevent scandium losses with the mother solution after precipitation of the scandium concentrate. Use of gaseous $CO_2$ from exhaust gases from industrial kilns for these purposes enables to additionally reduce operational expenses, as well as to reduce the environmental load due to the utilization of hazardous emissions.

Optimal parameters of both the carbonization leaching of scandium from a scandium-containing material and the extraction of the scandium concentrate were defined based on a number of experiments by means of varying pH values in the leaching slurry, concentrations of sodium carbonate and sodium bicarbonate in the liquid phase of the leached slurry, the leaching temperature, the mass ratio of solid to liquid phases (S:L) in the slurry, the residence time of the leaching process, the pH value and temperature during the extraction of the scandium concentrate. After the carbonization leaching of scandium, the slurry of the leached scandium-containing material was filtered, the cake was washed with water, and the cake and the filtrate were analyzed. The scandium concentrate was extracted from the obtained filtrate in one stage, the obtained concentrate precipitate was filtered and washed with water, and then samples of the scandium concentrate and mother solution were taken.

The present method can be used for the extraction of scandium from scandium-containing materials that are represented either in the form of a suspension (slurry) or in the form of solids. If a suspension (slurry) is used, it is preliminary filtered to separate the liquid phase and to obtain a cake of a scandium-containing material. Studies on the extraction of scandium from scandium-containing materials were carried out using red mud, which is the waste of alumina production from bauxites. Red mud is one of the most promising scandium raw materials in the world. The concentration of scandium oxide in red mud might vary within 40-250 g/t depending on the composition of the initial raw materials (bauxites) and methods of processing thereof.

Table 1 lists the chemical composition of the red mud, which was used for the studies. The industrial red mud slurry from an alumina refinery was preliminary filtered to separate the liquid phase. The content of scandium oxide in the solid phase of the red mud amounted to 0.019%.

TABLE 1

| $Sc_2O_3$ | $ZrO_2$ | $SiO_2$ | $Al_2O_3$ | $Fe_2O_3$ | $TiO_2$ | $P_2O_5$ | CaO | MgO | $Na_2O$ | $K_2O$ | MnO | $SO_3$ |
|---|---|---|---|---|---|---|---|---|---|---|---|---|
| 0.019 | 0.08 | 6.5 | 15.1 | 46.1 | 4.4 | 1.2 | 12.0 | 1.1 | 1.4 | <0.15 | 0.29 | 2.8 |

The results of experiments on determining an optimal pH value for the carbonization leaching of scandium from red mud are given in Table 2. The carbonization leaching of scandium was carried out using a solution with a $Na_2CO_3$ content of 200 $g/dm^3$ and a $NaHCO_3$ content of 10 $g/dm^3$, at a solid-to-liquid ratio of 1:8 (S:L), at a temperature of 80° C. for 3 hours while gassing the slurry with a $CO_2$-containig gas-air mixture under conditions enabling to achieve and maintain the target pH value.

TABLE 2

| | pH | | | | | | |
|---|---|---|---|---|---|---|---|
| | 9.0 | 9.5 | 10.0 | 10.5 | 11.0 | 11.5 | 12.0 |
| Degree of Sc extraction, % | 32.8 | 39.1 | 45.4 | 51.1 | 28.7 | 15.8 | 4.2 |

As can be seen from Table 2, the maximum degree of scandium extraction from red mud is achieved at pH values of 10-11. If said pH value reduces below 9.5, the degree of scandium extraction reduces due to the decrease of its equilibrium concentration in the solution in the presence of a significant amount of impurities of leached titanium and iron. If said pH value increases higher than 11, the degree of scandium extraction also reduces due to the decrease of the $HCO_3^-$-ion concentration in the solution, which ($HCO_3^-$-ion) shows a higher ability to form complex compounds with $Sc^{3+}$ rather than $CO_3^{2-}$.

The following two stages were carried out to determine the optimal composition of the leaching agent. First, the carbonization leaching of scandium was carried out at a fixed NaHCO3 concentration of 5 g/dm³ and a varying Na2CO3 concentration to determine the optimal range of the Na2CO3 concentration; after that, the carbonization leaching of scandium was carried out at a fixed Na2CO3 concentration and a varying NaHCO3 concentration. Other conditions of the experiments remained the same as stated above, i.e., a pH value of 10.5; a solid-to-liquid ratio of 1:8 (S:L), a temperature of 80° C., a process duration of 3 hours, gassing of the leached slurry with a CO2-containing gas-air mixture. The choice of the NaHCO3 concentration at various Na2CO3 concentrations is due to mutual solubility of the salts in the Na2CO3-NaHCO3 —H2O ternary system [Reference book of experimental data on the solubility of multicomponent aqueous salt systems, Volume 1, Book 1/Leningrad: Khimiya, 1973, pp. 476-477]. The results of the experiments are given in Table 3 and Table 4. The obtained data show that the optimal Na2CO3 concentration in the leaching solution, which provides for the maximum degree of scandium extraction from red mud, amounts to 180-250 g/dm³. If said Na2CO3 concentration reduces, the amount of the $CO_3^{2-}$ complex-former ions in the system decreases and, consequently, the degree of scandium dissolution from the solid phase into the solution reduces due to the formation of water-soluble complexes. Use of the Na2CO3 concentration of more than 350 g/dm³ is unreasonable due to the system's instability and the risk of crystallization of sodium bicarbonate or Na2CO3×NaHCO3×2H2O (known as "trona"). Moreover, if said Na2CO3 concentration increases above 300 g/dm³, the viscosity of the system significantly increases that results in a longer downstream settling process of the scandium concentrate and problems with the filtration thereof.

TABLE 3

| | $Na_2CO_3$ concentration, g/dm³ | | | | | | | |
|---|---|---|---|---|---|---|---|---|
| | 100 | 130 | 180 | 210 | 250 | 300 | 350 | 370 |
| Degree of Sc extraction, % | 25.4 | 31.9 | 34.8 | 39.2 | 42.4 | 49.4 | 51.2 | 48.3 |

As can be seen from Table 4, if the NaHCO3 concentration increases at a fixed Na2CO3 concentration, the degree of scandium extraction from red mud increases due to shifting the reaction equilibrium of formation of soluble scandium complex compounds with a hydrogen carbonate ion, or a bicarbonate ion, on the one hand, and the generation of ultra-disperse bubbles of carbon dioxide due to the thermal decomposition of sodium bicarbonate at a temperature of above 50° C., which also promotes formation of carbonate complex compounds. Therefore, the maximum degree of scandium extraction by carbonization leaching, with other conditions being equal, is achieved at a NaHCO3 concentration in the solution of 10-50 g/dm³ and a Na2CO3 concentration of 180-250 g/dm3, as well as at a NaHCO3 concentration in the solution of 2-10 g/dm³ and a Na2CO3 concentration of 300 g/dm³.

TABLE 4

| Test No. | $Na_2CO_3$ concentration, g/dm³ | $NaHCO_3$ concentration, g/dm³ | Degree of Sc extraction, % |
|---|---|---|---|
| 1 | 180 | 2 | 28.1 |
| 2 | | 10 | 51.8 |
| 3 | | 50 | 46.5 |
| 4 | | 100 | 37.4 |
| 5 | 250 | 2 | 29.6 |
| 6 | | 10 | 50.3 |
| 7 | | 50 | 45.8 |
| 8 | 300 | 2 | 48.2 |
| 9 | | 10 | 52.6 |

Table 5 lists the results of experiments regarding studying the impact of the leaching temperature on the extraction degree of the scandium concentrate and titanium impurities as the main impurity under the following leaching conditions: a pH value of 10.5; a solid-to-liquid ratio of 1:8 (S:L); the leaching solution's composition: a Na2CO3 content of 180 g/dm³ and a NaHCO3 content of 10 g/dm³; process duration: 3 hours; gassing of the leached slurry with a CO2-containing gas-air mixture. As one can see, increasing the temperature up to 80-90° C. improves the degree of scandium extraction due to better kinetics of the reaction of formation of soluble scandium compounds and reduces the degree of titanium extraction because of the secondary formation of insoluble titanium compounds, which advantageously influences further processing of the solution and the quality of the scandium concentrate. Iron and aluminum impurities demonstrate similar behavior. Reducing the concentration of the impurities in the pregnant scandium-containing solution results in lower alkali consumption for the extraction of the scandium concentrate, as well as a lower consumption of other reagents for the after-treatment of the concentrate to obtain scandium oxide.

TABLE 5

| Temperature, ° C. | Degree of Sc extraction, wt. % | Degree of Ti extraction, wt. % |
|---|---|---|
| 20 | 29.3 | 6.4 |
| 40 | 34.8 | 5.3 |
| 50 | 37.5 | 3.8 |
| 80 | 47.2 | 1.7 |
| 90 | 51.9 | 0.5 |
| 100 | 48.7 | 0.1 |

Table 6 provides information based on the results of experiments regarding studying the impact of the solid-to-liquid mass ratio (S:L) in the leaching slurry of red mud on the degree of scandium extraction at a pH value of 10.5; a temperature of 90° C.; the leaching solution with a content Na2CO3 of 180 g/dm³ and a NaHCO3 content of 10 g/dm³;

process duration of 3 hours. The analysis of the obtained data shows that the optimal solid-to-liquid mass ratio amounts to 1:6÷1:14 (S:L). Further increasing said solid-to-liquid ratio is unreasonable due to the high dilution of the solution in terms of scandium (and, consequently, the increase of power consumption for handling and heating the solutions) and the increase of alkali consumption for the extraction of the scandium concentrate.

TABLE 6

| | S:L | | | | | | | |
|---|---|---|---|---|---|---|---|---|
| | 1:1 | 1:2 | 1:4 | 1:6 | 1:10 | 1:14 | 1:18 | 1:20 |
| Degree of Sc extraction, wt. % | 19.3 | 37.8 | 43.2 | 48.1 | 51.2 | 51.7 | 52.0 | 52.1 |

Table 7 lists the results of experiments regarding determining the optimal duration of carbonization leaching of scandium from red mud with other conditions being equal, i.e., a pH value at the leaching stage of 10.5; a temperature of 90° C.; the leaching solution with a content Na2CO3 of 180 g/dm$^3$ and a NaHCO3 content of 10 g/dm$^3$; a solid-to-liquid ratio of 1:10 (S:L). If said leaching duration reduces to 1-2 hours, the degree of scandium extraction decreases significantly. Increasing the leaching duration to more than 8 hours does not improve the degree of scandium extraction because part of scandium is re-sorbed either on the surface of the leached red mud or on formed insoluble compounds of titanium and iron. Therefore, the optimal time of contact of the solution with the slurry at the stage of leaching of scandium from red mud amounts to 2-8 hours.

TABLE 7

| | Residence time, h | | | | | | |
|---|---|---|---|---|---|---|---|
| | 1 | 2 | 4 | 6 | 8 | 10 | 12 |
| Degree of Sc extraction, wt. % | 34.5 | 48.7 | 51.7 | 51.6 | 50.2 | 49.5 | 49.3 |

The precipitation of the scandium concentrate was studied using a filtrate from scandium carbonization leaching from red mud (a pregnant scandium-containing solution), which was obtained under defined optimal parameters of the leaching process and had the following composition: 120 g/dm$^3$ Na$_2$O$_{total}$, 15 mg/dm$^3$ Sc2O3, 12 mg/dm$^3$ ZrO2, 7.6 mg/dm$^3$ TiO2, 2.4 mg/dm$^3$ Fe2O3, 3.3 mg/dm$^3$ Al2O3, 1.6 mg/dm$^3$ SiO2, 13 mg/dm$^3$ CaO.

Table 8 lists the results of experiments regarding determining the optimal pH value for the precipitation of the scandium concentrate. The pH value was adjusted by varying the dosage of a sodium hydroxide solution in the pregnant solution. The precipitation of the scandium concentrate was carried out in one stage as follows: the pregnant solution was heated to a temperature of 80° C., the sodium hydroxide solution containing 45 wt. % NaOH was added, then the obtained solution was allowed to stand while stirring at the given temperature for 2 hours. Then the slurry of the scandium concentrate was allowed to settle with further filtration. As can be seen from Table 8, the maximum extraction of scandium from the solution into the concentrate to obtain a concentrate containing 10.1-13.8 wt. % Sc2O3 was achieved at a pH value of 12.5-13. If said pH value reduces, part of scandium remains in the solution and a weaker concentrate is obtained. If said pH value increases higher than the optimal value, alkali consumption increases, but the quality of the scandium concentrate does not improve.

TABLE 8

| | pH | | | | | |
|---|---|---|---|---|---|---|
| | 11.5 | 12.0 | 12.5 | 13.0 | 13.5 | 14 |
| Sc$_2$O$_3$ concentration in the concentrate, wt. % | 2.3 | 7.2 | 13.8 | 10.1 | 9.8 | 9.5 |

Table 9 lists some data on the correlation between the temperature at the stage of precipitation of the scandium concentrate and the degree of precipitation thereof at a pH value of 12.5 and a process duration of 2 hours. As one can see, the minimum scandium concentration in the mother solution after precipitation of the concentrate is demonstrated at a temperature of 80-100° C. If said temperature reduces below 60° C., the degree of scandium extraction from the solution into the concentrate reduces due to the fact that under the given conditions part of scandium is not bonded into low-soluble hydroxo complexes.

TABLE 9

| | Temperature, ° C. | | | | | |
|---|---|---|---|---|---|---|
| | 40 | 50 | 60 | 80 | 90 | 100 |
| Sc$_2$O$_3$ concentration in the mother solution, mg/dm$^3$ | 1.7 | 1.1 | 0.5 | 0.1 | 0.1 | 0.1 |

The optimal duration of extraction of the scandium concentrate from the pregnant solution of the composition given above was determined at a pH value of 12.5 and a temperature of 80° C. As can be seen from Table 10, the optimal duration of the scandium concentrate precipitation process amounts to 1-3 hours. If said duration of the scandium concentrate precipitation process increases, it does not affect the quality of the obtained concentrate, but it results in excessive power consumption.

TABLE 10

| | Process duration, h | | | | | |
|---|---|---|---|---|---|---|
| | 0.5 | 1 | 1.5 | 2 | 3 | 4 |
| Sc$_2$O$_3$ concentration in the mother solution, mg/dm$^3$ | 1.0 | 0.3 | 0.2 | 0.1 | 0.1 | 0.1 |

Based on the results of the carried-out experiments on the carbonization leaching of scandium from the scandium-containing material and the extraction of the scandium concentrate, the following optimal conditions of the main process operations were determined, namely:

a) Preparing a slurry from a scandium-containing material for leaching:
  the raw scandium-containing material is re-slurried using a solution with a Na2CO3 content of 130÷350 g/dm$^3$ and a NaHCO3 content of 2÷100 g/dm$^3$, preferably with a Na2CO3 content of 180÷250 g/dm$^3$ and a NaHCO3 content of 10÷50 g/dm$^3$;
  a solid-to-liquid ratio of 1: 2÷20 (S:L) in the slurry, preferably 1:6÷10;

b) Carbonization leaching of scandium from the scandium-containing material with a mixture of sodium carbonate and sodium bicarbonate:

a pH value at the leaching stage of 9.5-11, preferably 10÷11;
a process temperature of 20-90° C., preferably 80-90° C.;
residence time of 2÷10 hours, preferably 2-8 hours;
said pH value in the slurry is maintained by gassing the slurry with a CO2-containing gas-air mixture;
c) Precipitating a scandium concentrate by treating the scandium-containing solution, which has been obtained after filtration of the slurry of the scandium-containing material, with an alkaline solution:
a pH value of the scandium concentrate of 12÷13.5, preferably 12.5÷13.5;
the scandium concentrate is precipitated with a sodium hydroxide solution in one stage;
a process temperature of 50-100° C., preferably 80-90° C.;
residence time of 1÷3 hours;
d) Gassing the mother solution after the precipitation of the scandium concentrate to restore the required $Na_2CO_3$ to $NaHCO_3$ ratio;
a process temperature of 15÷50° C., preferably 20÷40° C.;
gassing with a CO2-containing gas-air mixture.

FIG. 1 shows a basic block diagram of the claimed process for the extraction of scandium from scandium-containing materials, which includes a number of process steps:
re-slurring of a cake of a scandium-containing material with a mixture of sodium carbonate and sodium bicarbonate;
carbonization leaching of the scandium-containing material with the mixture of sodium carbonate and sodium bicarbonate;
filtration of the leached slurry;
precipitation of a scandium concentrate by treating the scandium-containing filtrate with an alkaline solution;
gassing the mother solution from the precipitation of the scandium concentrate with a CO2-containing gas-air mixture.

The following Examples confirm the possibility of carrying-out the claimed method, as well as the advantages of said method as compared to the closest prior art.

Example 1

A cake of wet red mud in the amount of 115 g, which had been obtained by filtering a slurry of raw red mud from the RUSAL Krasnoturinsk refinery, was re-slurried in a 1-$dm^3$ reactor (moisture 30.3%, the chemical composition is given in Table 1) using a mixture of sodium carbonate and sodium bicarbonate with a Na2CO3 content of 230 g/$dm^3$ and a NaHCO3 content of 25 g/$dm^3$ making up the total volume of the slurry to 850 mL. The obtained slurry was placed into a heating block, heated to a temperature of 85° C., and allowed to stand at said temperature for 4 hours while continuously monitoring the pH value and maintaining said pH value at 10.5 by gassing the slurry with carbon dioxide supplied from a cylinder. The obtained leached red mud slurry was filtered under vacuum; the cake of the leached red mud slurry was washed with water (100 mL) and sent for analysis. The Sc2O3 concentration in the filtrate from red mud leaching (pregnant solution) amounted to 7.82 mg/dm'. Table 11 demonstrates the chemical composition of the cake of the leached red mud (wt. %).

TABLE 11

| $Sc_2O_3$ | $ZrO_2$ | $SiO_2$ | $Al_2O_3$ | $Fe_2O_3$ | $TiO_2$ | $P_2O_5$ | CaO | MgO | $Na_2O$ | MnO | $SO_3$ |
|---|---|---|---|---|---|---|---|---|---|---|---|
| 0.0092 | 0.053 | 4.7 | 12.5 | 43.1 | 4.1 | 0.9 | 9.1 | 0.8 | 2.7 | 0.2 | 2.8 |

Based on the data on the scandium content in the raw red mud (Table 1) and the cake of the leached red mud (Table 11), the degree of scandium extraction at the carbonization leaching stage amounted to 51.6%, i.e., 22.5% higher as compared with the prior art.

Example 2

The filtrate from the red mud leaching stage, which had been obtained at the red mud carbonization leaching stage under the conditions given in Example 1, was poured into a reactor with a volume of 2 $dm^3$ and heated to a temperature of 80° C.; then a strong alkaline solution with a NaOH concentration of 45% was added to obtain a pH of 12.5. The obtained slurry of the scandium concentrate was allowed to stand at said temperature for 1 hour, the scandium concentrate was allowed to settle for 4 hours, then a clarified layer of the mother solution was decanted and a thickened slurry was filtered under vacuum and washed with water. Table 12 demonstrates the chemical composition of the obtained scandium concentrate (wt. %).

TABLE 12

| $Sc_2O_3$ | $ZrO_2$ | $SiO_2$ | $Al_2O_3$ | $Fe_2O_3$ | $TiO_2$ | $P_2O_5$ | CaO | MgO | $Na_2O$ | $K_2O$ | MnO | $SO_3$ |
|---|---|---|---|---|---|---|---|---|---|---|---|---|
| 13.8 | 14.4 | 3.8 | 0.4 | 4.2 | 9.6 | 3.5 | 12.0 | 0.6 | 1.4 | <0.15 | 0.29 | 2.8 |

Thus, the use of the present method of extraction of scandium from scandium-containing materials, which comprises the carbonization leaching of scandium under the determined optimal conditions, including further scandium concentrate precipitation in one stage, enables to achieve a higher degree of scandium extraction, simplify the process flow diagram and reduce the consumption of reagents, which allows significantly reducing operational and capital expenses.

What is claimed is:
1. A method for extracting scandium from scandium-containing materials, said method comprising:
slurring/re-slurring of a cake of a scandium-containing material with a mixture of sodium carbonate and sodium bicarbonate,
carbonization leaching of a slurry of the scandium-containing material with the mixture of sodium carbonate and sodium bicarbonate, filtration of the leached slurry and a precipitation of a scandium concentrate from the obtained filtrate, wherein:

the carbonization leaching of the slurry is carried out with a mixture of sodium carbonate and sodium bicarbonate having a Na2CO3 concentration of 130-350 g/dm3 and a NaHCO3 concentration of 2-100 g/dm3 at a pH value of 9.5-11.0, maintaining the pH value in the slurry comprises gassing the slurry with a CO2-containing gas-air mixture, such that the scandium concentrate is precipitated in one stage by treating the solution resulting from the filtration of the slurry of the scandium-containing material with an alkaline solution.

2. The method of claim 1, wherein liquefied CO2 and gaseous CO2 of exhaust gases from industrial kilns are used for gassing the slurry during the carbonization leaching.

3. The method of claim 1, wherein liquefied CO2 or gaseous CO2 of exhaust gases from industrial kilns is used for gassing the slurry during the carbonization leaching.

4. The method of claim 1, wherein the carbonization leaching of the slurry is carried out at a solid-to-liquid ratio of 1:2-20 (S:L).

5. The method of claim 1, wherein the carbonization leaching of the slurry is carried out for 2-10 hours.

6. The method of claim 1, wherein the carbonization leaching of the slurry is carried out at a temperature of 20-90° C.

7. The method of claim 1, wherein the scandium concentrate is precipitated with an alkaline solution at a pH value of 12-13.5.

8. The method of claim 1, wherein the scandium concentrate is precipitated at a temperature of 50-100° C.

9. The method of claim 1, wherein the scandium concentrate is precipitated for 1-3 hours.

10. The method of claim 1, wherein the solution resulting from the precipitation of the scandium concentrate is gassed with the CO2-containing gas-air mixture at a temperature of 15-50° C. to restore the required Na2CO3 to NaHCO3 ratio and returned for the re-slurring of a new batch of the cake of the scandium-containing material.

11. The method of claim 1, wherein a solution of sodium hydroxide or potassium hydroxide or a solution of ammonium hydroxide is used as the alkaline solution at the stage of precipitating the scandium concentrate.

* * * * *